United States Patent
Freeman et al.

(10) Patent No.: US 12,050,543 B2
(45) Date of Patent: Jul. 30, 2024

(54) AUTOMATIC NAMING AND CONFIGURATION OF A REPLACEMENT ELECTRONIC DEVICE

(71) Applicant: Schneider Electric USA, Inc., Andover, MA (US)

(72) Inventors: Alan E. Freeman, Raleigh, NC (US); Benjamin W. Edwards, Rolesville, NC (US); Matthew L. White, Cary, NC (US); Kevin Jefferies, Raleigh, NC (US)

(73) Assignee: Schneider Electric USA, Inc., Boston, MA (US)

( * ) Notice: Subject to any disclaimer, the term of this patent is extended or adjusted under 35 U.S.C. 154(b) by 135 days.

(21) Appl. No.: 17/718,743

(22) Filed: Apr. 12, 2022

(65) Prior Publication Data
US 2023/0325332 A1  Oct. 12, 2023

(51) Int. Cl.
*G06F 13/40* (2006.01)

(52) U.S. Cl.
CPC ...... *G06F 13/4004* (2013.01); *G06F 2213/40* (2013.01)

(58) Field of Classification Search
CPC ............. G06F 13/4004; G06F 2213/40; H04L 41/12; H04L 41/0816
See application file for complete search history.

(56) References Cited

U.S. PATENT DOCUMENTS

| | | | |
|---|---|---|---|
| 8,667,265 B1 | 3/2014 | Hamlet et al. | |
| 9,798,677 B2 | 10/2017 | Thom et al. | |
| 9,906,402 B2 | 2/2018 | Ramachandran et al. | |
| 10,237,061 B2 | 3/2019 | Gazit et al. | |
| 11,075,807 B2 * | 7/2021 | Givehchi | G05B 19/0426 |
| 2002/0046263 A1 | 4/2002 | Camerini et al. | |

(Continued)

FOREIGN PATENT DOCUMENTS

| | | |
|---|---|---|
| EP | 3819728 A1 | 5/2021 |
| WO | WO-2020247228 A1 | 12/2020 |

OTHER PUBLICATIONS

International Search Report and Written Opinion for PCT Application No. PCT/US2023/018152, date Jul. 6, 2023.

(Continued)

*Primary Examiner* — Brian T Misiura
(74) *Attorney, Agent, or Firm* — Locke Lord LLP; Judy Naamat; Peter N. Fill

(57) ABSTRACT

A method is performed by a bus coupler of a subnetwork of one or more local subnetworks coupled to an overall network is provided, including performing a local discovery process for discovering and identifying one or more bus devices included in the subnetwork. The method further includes submitting an internet protocol (IP) address request to obtain an IP address for the bus coupler, receiving at the bus coupler the IP address of the bus coupler in response to the IP address assignment request, submitting a configuration request for configuration information associated with a device name for the bus coupler, receiving the configuration information in response to the configuration request, and configuring at least one feature of the bus coupler using the configuration information, wherein the device name is based on identifier(s) of the respective one or more bus devices obtained by the discovery process.

23 Claims, 5 Drawing Sheets

(56) References Cited

U.S. PATENT DOCUMENTS

| | | | |
|---|---|---|---|
| 2003/0041088 A1 | 2/2003 | Wilson et al. | |
| 2007/0268514 A1 | 11/2007 | Zeldin et al. | |
| 2008/0098401 A1 | 4/2008 | Weatherhead et al. | |
| 2008/0101319 A1 | 5/2008 | Rao | |
| 2008/0101419 A1 | 5/2008 | Suriyanarayanan | |
| 2009/0091442 A1 | 4/2009 | Howarth et al. | |
| 2009/0094491 A1* | 4/2009 | Sharma | H04L 41/06 |
| | | | 714/E11.002 |
| 2009/0228611 A1 | 9/2009 | Ferguson et al. | |
| 2010/0180016 A1 | 7/2010 | Bugwadia et al. | |
| 2011/0313547 A1 | 12/2011 | Hernandez et al. | |
| 2013/0036311 A1 | 2/2013 | Akyol et al. | |
| 2015/0089568 A1 | 3/2015 | Sprague et al. | |
| 2015/0280916 A1 | 10/2015 | Bjarnason et al. | |
| 2016/0036638 A1 | 2/2016 | Campbell et al. | |
| 2016/0080502 A1 | 3/2016 | Yadav et al. | |
| 2017/0150535 A1 | 5/2017 | Wynn et al. | |
| 2017/0187577 A1 | 6/2017 | Nevrekar et al. | |
| 2018/0310121 A1 | 10/2018 | Milton et al. | |
| 2018/0316729 A1 | 11/2018 | Chauvet et al. | |
| 2020/0387614 A1* | 12/2020 | Harrison | H04L 9/0863 |
| 2021/0135942 A1 | 5/2021 | Jefferies et al. | |

OTHER PUBLICATIONS

Extended European Search Report for European Patent Application No. EP20201548.3, dated Mar. 11, 2021.

International Search Report and Written Opinion for PCT Patent Application No. PCT/US20/34838, dated Aug. 12, 2020.

\* cited by examiner

AUTOMATIC NAMING AND CONFIGURATION OF A REPLACEMENT ELECTRONIC DEVICE

TECHNICAL FIELD

The present disclosure relates to electronic fast device replacement, and more particularly, to techniques for automatically naming and configuring a replacement electronic device.

BACKGROUND

As the number of interconnected electronic devices continues to grow, it is increasingly important to efficiently manage the replacement of electronic devices and the configuration of new electronic devices. While historically engineers were required to manually configure replacement electronic devices, such a practice is very burdensome and inefficient in an environment with a substantial number of interconnected electronic devices. Additionally, as the configurability and flexibility of electronic devices has increased, these devices have become more complicated to configure and frequently require specialized knowledge and tools to configure. These difficulties are exacerbated in environments where, due to business reasons, downtime needs to be minimized. For example, a substantial amount of downtime in a factory environment can create bottlenecks in an assembly line and can delay production schedules, thereby incurring a significant cost for the business. As another example, a lengthy downtime of an electronic device that hosts a component of a website for a large retailer can cost the retailer a significant amount in lost sales and customer good will. As such, it has become increasingly problematic and, in some cases, infeasible to rely on engineers to manually configure all replacement devices in modern computing environments.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method performed by a bus coupler of a subnetwork of one or more subnetworks coupled to an overall network. The method includes performing a local discovery process for discovering and identifying one or more bus devices included in the subnetwork, submitting, by the bus coupler via the overall network and external to the subnetwork, an internet protocol (IP) address request to obtain an IP address for the bus coupler, receiving, by the bus coupler, the IP address of the bus coupler in response to the IP address assignment request, submitting, by the bus coupler via the overall network and external to the subnetwork, a configuration request for configuration information associated with a device name for the bus coupler, wherein the device name is based on identifier(s) of the respective one or more bus devices obtained by the discovery process, receiving the configuration information in response to the configuration request, and configuring at least one feature of the bus coupler using the configuration information.

In one or more embodiments, the method can further include computing at the bus coupler a topology hash by applying a hash function to the identifier(s) of the respective one or more bus devices, wherein the device name is based on the topology hash.

In one or more embodiments, the one or more bus devices can include a plurality of bus devices, the method further comprising combining the identifiers of the respective plurality of bus devices, wherein the hash function can be applied to the combination.

In one or more embodiments, combining the identifiers of the plurality of bus devices can include concatenating the identifiers of the respective plurality of bus devices in a predefined order.

In one or more embodiments, the identifiers of the respective plurality of bus devices can be concatenated based on an order in which the bus devices corresponding to the respective identifications are discovered, based on a topology of the subnetwork, based on information included in the respective identifiers, and/or based on the connections between the bus devices that were discovered.

In one or more embodiments, the identifier(s) of the one or more bus devices can include one or more commercial references.

In one or more embodiments, a path to a server to service the configuration request can be provided in response to the address request, and the configuration request is submitted using the path.

In one or more embodiments, the configuration information can be further correlated with a network name of the bus coupler, wherein the network name can be a name to identify the bus coupler and can be used for network discovery requests and identification of the bus coupler by network devices coupled to the overall network that are external to the subnetwork.

In one or more embodiments, the method can further include validating the configuration information, wherein the at least one feature of the bus coupler can be configured once the configuration information is validated.

In one or more embodiments, configuring the at least one feature of the bus coupler can further include configuring at least one of (i) network connectivity information and (ii) application-specific configuration information, for the bus coupler.

In one or more embodiments, the method can further include determining, by the bus coupler, that the bus coupler needs to be configured or reconfigured, wherein in response to determining that the bus coupler needs to be configured or reconfigured, the bus coupler can initiate performing the discovery process, submitting the address request, and/or submitting the configuration request.

In accordance with a further aspect of the disclosure, a method performed by a fast device replacement (FDR) server is disclosed. The method includes receiving, via an overall network coupled to one or more subnetworks, a configuration request from a bus coupler of a subnetwork of the one or more subnetworks. The configuration request was provided external to the subnetwork and requests configuration information associated with a device name for the bus coupler, wherein the device name is based on identifier(s) of respective one or more bus devices obtained by a local discovery process for discovering and identifying the respective one or more bus devices included in the subnetwork. The method further includes accessing a mapping of device names for each bus coupler of the respective one or more subnetworks to configuration information for the bus coupler. The device name for each of the bus couplers is based on identifier(s) of respective one or more bus devices obtained by a previously performed discovery process that was performed locally within the bus coupler's subnetwork for discovering and identifying respective the one or more bus devices included in the subnetwork. The method further includes providing the configuration information that is mapped to the device name in the configuration request in response to the configuration request.

In one or more embodiments, the method can further include determining that the bus coupler needs configuration or reconfiguration, wherein in response to determining that the bus coupler needs to be configured or reconfigured, the FDR server can access the mapping and provide the configuration response.

In one or more embodiments, the device name can be based on a topology hash computed at the bus coupler by applying a hash function to the identifier(s) of the respective one or more bus devices.

In one or more embodiments, the one or more bus devices can include a plurality of bus devices, wherein the hash function can be applied to a combination of the identifiers of the respective plurality of bus devices.

In one or more embodiments, the combination of the identifiers can be a concatenation of the identifiers in a predefined order, wherein the concatenation of the identifiers can be based on an order in which the bus devices corresponding to the respective identifications are discovered, based on a topology of the subnetwork, based on information included in the respective identifiers, and/or based on connections between the bus devices that were discovered.

In one or more embodiments, the mapping can further map the device name to a network name of the bus coupler, wherein the network name can be a name to identify the bus coupler and can be used for network discovery requests and identification of the bus coupler by network devices coupled to the overall network that are external to the subnetwork.

In one or more embodiments, the configuration information can be usable by the bus coupler to configure at least one feature of the bus coupler, including at least one of (i) network connectivity information and (ii) application-specific configuration information.

In accordance with further aspects of the disclosure, a bus coupler of a subnetwork of one or more subnetworks coupled to an overall network is provided. The bus coupler include a memory configured to store instructions and one or more processing devices disposed in communication with the memory, wherein the one or more processing devices upon execution of the instructions are configured to perform a local discovery process for discovering and identifying one or more bus devices included in the subnetwork, submit, via the overall network and external to the subnetwork, an internet protocol (IP) address request to obtain an IP address for the bus coupler; receive the IP address of the bus coupler in response to the IP address assignment request, submit, via the overall network and external to the subnetwork, a configuration request for configuration information associated with a device name for the bus coupler, wherein the device name is based on identifier(s) of the respective one or more bus devices obtained by the discovery process, receive the configuration information in response to the configuration request, and configure at least one feature of the bus coupler using the configuration information.

In one or more embodiments, the one or more bus devices can include a plurality of bus devices and the one or more processing devices upon execution of the instructions can be further configured to combine the identifiers of the respective plurality of bus devices and apply a hash function to the combined identifier(s), wherein the device name can be based on the topology hash.

In accordance with still another aspect of the disclosure, an FDR server is disclosed. The FDR server includes a memory configured to store instructions and one or more processing devices disposed in communication with the memory. The one or more processing devices upon execution of the instructions are configured to receive, via an overall network coupled to one or more subnetworks, a configuration request from a bus coupler of a subnetwork of the one or more subnetworks, access a mapping of device names for each bus coupler of the respective one or more subnetworks to configuration information for the bus coupler, and provide the configuration information in response to the configuration request. The configuration request was provided external to the subnetwork and requests configuration information associated with a device name for the bus coupler, wherein the device name is based on identifier(s) of respective one or more bus devices obtained by a local discovery process for discovering and identifying the respective one or more bus devices included in the subnetwork. The device name for each of the bus couplers is based on identifier(s) of respective one or more bus devices obtained by a previously performed discovery process that was performed locally within the bus coupler's subnetwork for discovering and identifying respective the one or more bus devices included in the subnetwork.

In one or more embodiments, the one or more bus devices can include a plurality of bus devices, and the device name can be based on a topology hash computed at the bus coupler by applying a hash function to a combination of the identifiers of the respective plurality of bus devices.

In accordance with a further aspect of the disclosure, an industrial network system is provided. The industrial network system includes a bus coupler of a subnetwork of one or more subnetworks coupled to an overall network, as disclosed, and an FDR server, as disclosed.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

Figure 1:
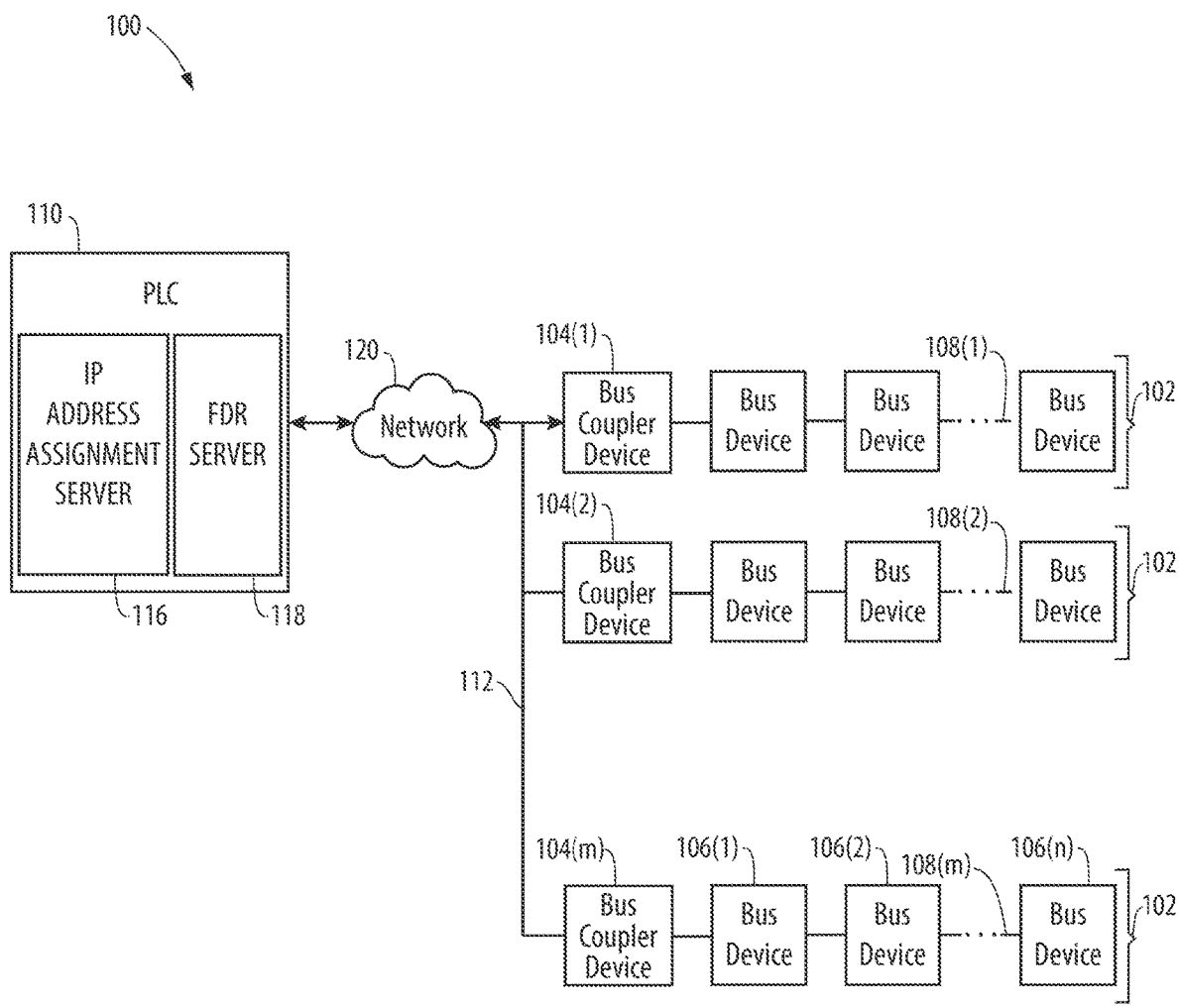
FIG. 1 is a block diagram illustrating an example industrial network system, in accordance with one or more embodiments of the disclosure.

Efficient and reliable device replacement services are becoming increasingly important, as the number of interconnected electronic devices continues to grow. In many modern computing environments, it is becoming infeasible to rely exclusively on technicians/maintenance personnel to manually replace electronic devices, as (amongst other reasons) the manual configuration of replacement electronic devices can be a time-consuming process and can require special tools or specific multi-disciplinary technical expertise and knowledge. While conventional solutions exist for automatically configuring replacement devices within an industrial network system, such solutions can require a rigid network topology for devices connected to an overall network system that uses data communication, wherein the network topology is relative to the overall network system. That is, a replacement device can only be configured using such conventional systems when the replacement device is in the exact same position within the static overall network topology as the device being replaced.

It is further noted that usage of bus devices in the industrial network system to assist with automatic configuration of a replacement device is not appropriate in circumstances in which the bus device is a low-level electronic device that is a simple device with limited processing and/or storage resources. The processing and/or storage resources of the bus device can be too limited to assist with automatic configuration of a replacement device, such as a bus coupler to which the bus device is connected. The bus device may also be incapable of data communication with the overall network system, and may be restricted to local communication within a subnetwork having only the bus coupler and the bus devices connected via the subnetwork to that bus coupler.

While conventional solutions have generally been considered satisfactory for their intended purpose, enforcing a static network topology associated with an overall network system is not always desirable or even feasible, and there is still a need in the art for an FDR service that allows flexibility of the network topology for a replacement electronic device that is included in the network topology, as well as an FDR service that can be provided regardless of the computing and storage capacity of bus devices included in the industrial network system.

As such, embodiments described herein provide techniques for automatically naming and configuring a replacement device for a bus coupler using information based on a discovery process limited to a subnetwork that includes the replacement device for the bus coupler (referred to herein as the bus coupler) and one or more bus devices connected locally to the bus coupler. In doing so, embodiments described herein can minimize downtime of replacement devices, in large part by facilitating the automatic transfer of settings and configuration parameters to the replacement device independent of processing or storage capacity of bus devices and allowing for flexible connection of the bus couplers and their replacement devices to the overall data communication network of the industrial network system. This flexibility allows for bus couplers and their replacement devices to be free to use different ports (e.g., Ethernet ports) or to have different neighbors on the overall data communication network of the industrial network system.

Potential advantages and benefits can include minimization or elimination of a need for manual configuration (e.g., by an engineer) to bring the replacement device into service, and elimination of a need for users to know and keep track of the network name of devices being replaced. Moreover, embodiments can reduce the potential for user error when setting a network name for the bus coupler, and can avoid the need for users to manually configure the replacement device.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Turning now descriptively to the drawings, in which similar reference characters denote similar elements throughout the several views, FIG. 1 is a block diagram illustrating an exemplary industrial network system 100 in which below illustrated embodiments may be implemented. Industrial network system 100 includes a PLC 110 and one or more bus couplers 104(1)-104(m) (referred to generally as bus couplers 104) in data communication via network 120 with a data communication bus 112. Network 120 provides an overall network to which each of bus couplers 104(1)-104(m) can be coupled. Bus couplers 104(1)-104(m) can be originally installed bus couplers or replacement bus couplers.

Network 120 represents any suitable data communications network, with examples including (without limitation) a local area network (LAN), a wide area network (WAN), an IEEE 802.11 wireless network, a Wi-Fi network, routers, hubs, switches, server computers, and/or a combination thereof, and so on. Communication links between devices, such as between fieldbus devices 106, bus devices 106, fieldbus devices 106 or PLC 110 and network 120 can be hardwired links, wireless links, or a combination of hardwired or wireless links. In the example shown, network 120 is embodied as using Ethernet protocol, and bus couplers 104 are not constrained to use a particular Ethernet port when replaced.

Industrial network system 100 further includes one or more subnetworks 102 having a bus coupler 104, each bus coupler 104 being locally connected to one or more bus devices 106 via a sub-bus 108. The bus devices 106 are not connected directly to any networks or devices outside of their subnetwork. For example, bus couplers 104(1)-104(m) are connected to a sub-bus 108(1)-108(m). The automatic replacement process does not use direct communication between any of bus devices 106 and data communication bus 112 or network 120, and does not need bus devices 106 to process or store information associated with the automatic replacement process.

In one or more embodiments, one or more (or all) of bus devices 106 can be connected to data communication bus 112 only via the bus coupler 104 to which it is locally connected. Additionally, one or more (or all) of bus devices 106 can have limited processing and storage capacities, such that they are not capable of participating in the automatic replacement process.

In one or more embodiments, one or more of bus devices 106 can be capable of connecting to data communication bus 112 independent of its associated bus coupler 104 and/or can have processing and/or a more substantial storage capacity. However, even so, the automatic replacement process is performed independent of the bus device's capability of data communication with data communication bus 112 or network 120 and independent of any more substantial processing and/or storage capabilities, even if either or both do exist.

PLC 110 is shown including an IP address assignment server 118 and an FDR server 118. One or both of IP address assignment server 118 and FDR server 118 can be integrated with PLC 110 or can be discrete from PLC 110 (e.g., can have its own IP address, housing, processor) and can be connected to PLC 110 directly, or can be accessible to bus couplers 104(*i*) and PLC 110 via network 120.

It is to be appreciated the illustrated embodiments discussed below are preferably a software algorithm, program, code, or logic residing on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 2:
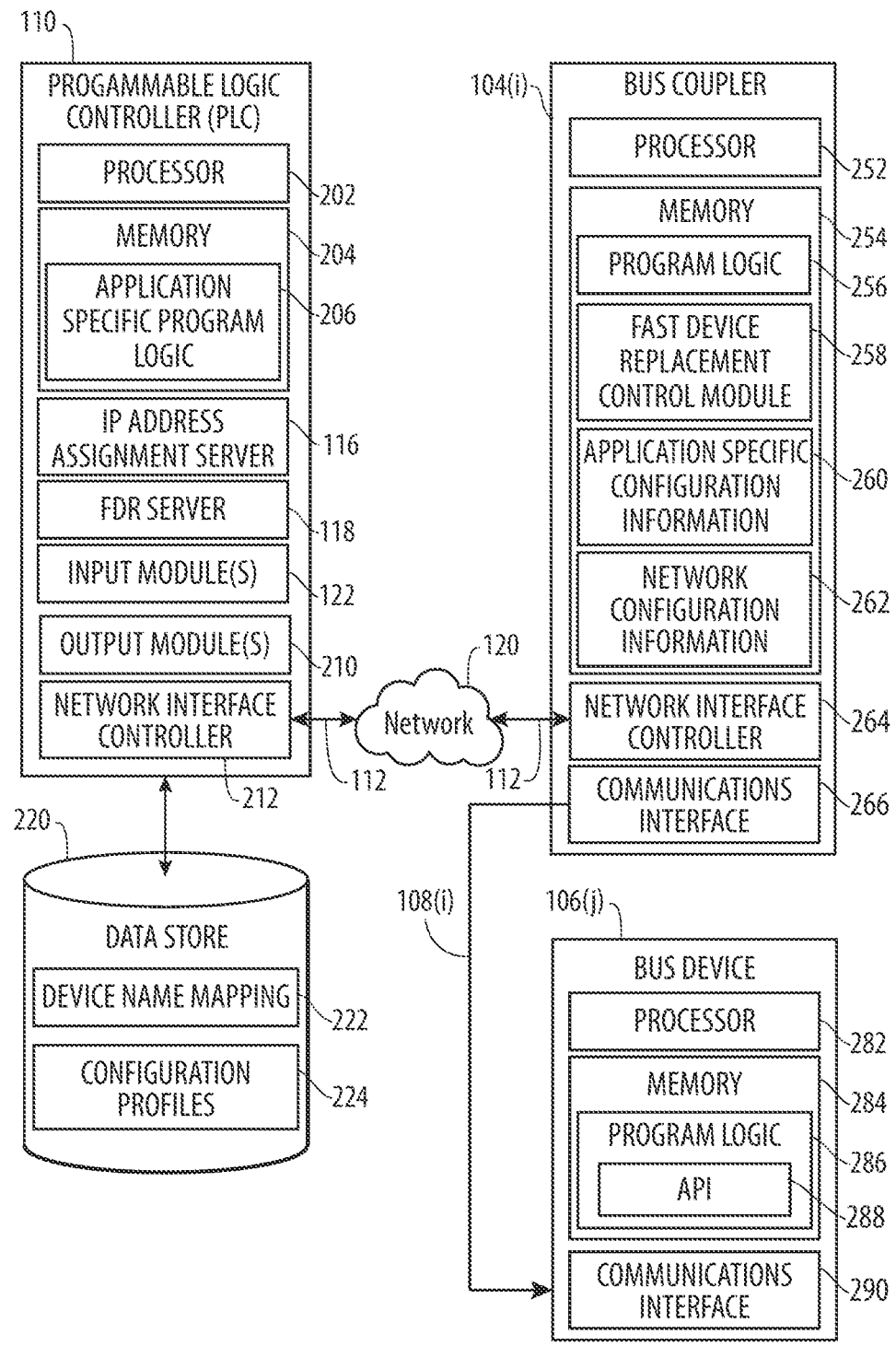
FIG. 2 is a block diagram illustrating a portion of the industrial network system shown in FIG. 1.

FIG. 2 is a block diagram illustrating industrial network system 100 with PLC 110, one bus coupler 104(*i*) (wherein 1 <=i<=m) and one bus device 106(*j*) (wherein 1 <=j<=n) connected to bus coupler 104(*i*) via sub-bus 108(*i*). The bus coupler 104(*i*) shown in FIG. 2 is shown as an example replacement bus coupler that replaces a previous bus coupler (which could be an originally installed bus coupler or could also be a replacement bus coupler).

PLC 110 and bus coupler 104(1) communicate via data communication bus 112, which can be connected to the network 120. PLC 110 includes one or more computer processors 202, a memory 204, an input module(s) 206, an output module(s) 210, a network interface controller 210, and IP address assignment logic 214. Generally, the input module(s) 206 represent devices that provide inputs to the PLC 110. Such inputs may be provided, for example, in the form of digital inputs or analog signals. In the case of analog signals, the input module 206 can include circuitry for converting the analog signals into logic signals that can be processed by the processor 202. The output modules 210 generally convert logic signals from the processor 202 into digital or analog values for use in controlling output devices. The memory 204 can store application-specific program logic 206, IP address assignment server 116, and FDR server. Generally, the application-specific program logic 206 represents software logic that performs various application-specific operations, depending on the type of environment of the industrial network system 100. For example, a PLC device 110 within an industrial automation environment may perform different application-specific operations than a PLC device 110 within a fulfillment center environment.

The data store 220 includes a device name mapping 222 and configuration profiles collection 224. The device name mapping 222 generally represents a data structure that maps device names with configuration information stored in the configuration profiles collection 224. For example, the device name mapping 222 could represent a table within a database (e.g., having a first column for device names, a second column for a configuration information identifiers and rows storing individual mappings between device names and configuration information identifiers). More generally, however, any sort of mapping between device names and configuration information can be used, consistent with the functionality described herein. Configuration profiles collection 224 can include a plurality of configuration profiles, each configuration profile having configuration information mapped to a configuration information identifier. The configuration information identifier in device name mapping 222 can be used to access the appropriate configuration information stored in configuration profiles collection 224.

Generally, the bus coupler 104(*i*) represents a computing device within the industrial network system 100 for real-time distributed control. In the depicted embodiment, the bus coupler 104(*i*) serves as a management device for the bus devices 106, which are generally lower level devices (e.g., motor starters, power devices, sensor devices, etc.). For example, the bus coupler 104(*i*) may orchestrate the performance of an operation by controlling the actions of one or more of the bus devices 106. As another example, the bus coupler 104(*i*) could collect data (e.g., sensor data) from the bus devices 106, and could process and aggregate this data for subsequent transmission to the PLC 110. The PLC 110 can generally perform higher level management functions and may manage the bus coupler 104(*i*) as well as other bus couplers (not shown) within industrial network system 100.

The bus coupler 104(*i*) includes a processor 252, a memory 254, a network interface controller 264 and a communications interface 266. The memory 254 includes program logic 256, a fast device replacement (FDR) control module 258, application-specific configuration information 260 and network configuration information 262. Generally, the program logic 256 represents application-specific program logic to carry out one or more functions that have been assigned to the bus coupler 104(*i*). For example, the operations the bus coupler 104(*i*) may be configured to perform within an industrial automation environment may differ from the operations the bus coupler 104(*i*) performs in other computing environments, and thus the program logic 256 may vary depending on the type of environment in which the bus coupler 104(*i*) is deployed.

In the depicted embodiment, the bus device 106(*j*) includes a processor 282, a memory 284, and a communications interface 290. The memory 284 contains program logic 286, which in turns contains an application specific interface (API) 288. API 288 can facilitate performance of tasks assigned to bus device 106, such as to report or store sensed data, actuate a switch, etc. Bus device 106(*j*) can be incapable of communicating with data communication bus 112 or network 140, except via its communications interface 290, sub-bus 108(*i*), and bus coupler 104(*i*). For example, the bus device 106(*j*) shown in the example does not include a network interface controller, such as network interface controllers 264 or 212. Even if bus device 106(j) included a network interface controller, this would not be needed for requesting configuration information.

Communications interface 290 provides local data communication within only a subnetwork 102 that includes only devices that are connected to sub-bus 108(i), including bus coupler 104(i) and the other bus devices 106(1)-106(n) connected to sub-bus 108(i). Each bus coupler 104(i) communicates via its communication interface 266 with its own subnetwork 102 that includes one or more bus devices 106(1)-106(n). When bus coupler 104(i) is connected to its corresponding sub-bus 108(i) as a replacement device, it can discover each of the bus devices 106(1)-106(j) connected to sub-bus 108(i) using a discovery process described below. In one or more embodiments, each of the subnetworks 102 can be mutually exclusive relative to the other subnetworks, such that there are not any devices that are included within more than one subnetwork.

Any general-purpose computer systems used in various embodiments of this disclosure may be, for example, general-purpose computers with general-purpose computer processors. For example, the processors 202, 252 and 282 may include processors based on Intel PENTIUM-type processor, Motorola PowerPC, Sun UltraSPARC, Hewlett-Packard PA-RISC processors, or any other type of processor. Generally, the processors 202, 252 and 282 represent any suitable processor(s), including commercially available processors such as the well-known Pentium class processor available from the Intel Corporation. Many other processors are available. Such a processor usually executes an operating system (not shown) which may be, for example and without limitation, Microsoft® Windows®, Apple® macOS®, Solaris®, UNIX®, or Linux®. Many other operating systems may be used.

The memories 204, 254 and 284 generally represents any suitable form of addressable computer memory. For example, the memories 204, 254 and 284 may represent a volatile memory (e.g., static random-access memory (SRAM)) and/or a non-volatile memory (e.g., Flash memory). More generally, any suitable form of memory device(s) can be used, consistent with the functionality described herein. Generally, the processor and operating system together define a computer platform for which application programs in high-level programming languages are written. It should be understood that embodiments of the present disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions (other than internal portions of local subnetworks) of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

Bus coupler 104 is communicatively coupled with bus devices 106 of the same subnetwork 102 via its communications interface 266 and a communications interface 290 for each of the bus devices 106. For example, the bus coupler 104 and bus devices 106 could be connected in any topology, such as in a daisy chain fashion forming a linear network topology, or any of ring, star, bus, mesh, tree, or hybrid topologies. Numerous different configurations and network topologies are contemplated and more generally, any suitable configuration and topology can be used, consistent with the functionality described herein.

FDR control module 258 can be preloaded on bus coupler 104, such as at the time of manufacture, or alternatively bus coupler 104 can be updated or retrofitted to include FDR control module 258 configured to provide the disclosed functionality. Similarly IP assignment server 116 and/or FDR server 118 can be preloaded on PLC 110, such as at the time of manufacture, or alternatively PLC 110 can be updated or retrofitted to include IP assignment server 116 and/or FDR server 118, each being configured to provide the disclosed functionality.

According to one embodiment, the FDR control module 258 can determine that the bus coupler 104(i) needs to be configured (or reconfigured), based on a determination that the bus coupler 104(i) has been added (e.g., as a replacement device) to a computing environment, such as industrial network system 100, and/or that at least one feature of the bus coupler 104(i) is unconfigured or misconfigured for its current environment. For example, a hypothetical bus coupler could be misconfigured for its current environment when the bus coupler was moved from a different computing environment (or a different logical position within the computing environment) to its current position. In such an example, the FDR control module 258 could determine that the bus coupler's configuration information does not match its current physical configuration. As an example, if the bus coupler's configuration information specifies that it is connected to bus devices A, B and C, but its FDR control module 258 detects that the bus coupler is currently connected to bus devices X, Y, and Z (e.g., through a network discovery process), the FDR control module 258 could determine that the bus coupler is misconfigured for its current physical configuration.

Once the FDR control module 258 of bus coupler 104(i) determines that bus coupler 104(i) needs to be configured (or reconfigured, e.g., due to changes or an upgrade to its subnetwork), it can then initiate an appropriate stage of the replacement process, including the discovery phase, the IP address assignment phase, or submission of a reconfiguration request.

The discovery phase can be initiated to discover and identify one or more bus devices 106 that are included in bus coupler 104(i)'s subnetwork 102 and are connected to sub-bus 108(i). Generally, the discovery phase can use a number of different device discovery protocols for discovering and identifying bus devices 106 included in the subnetwork 102 of bus coupler 104(i). Discovery operations usually operate using simple communication techniques that require minimal processing and storage capability, such as broadcast messages and replies to sources of broadcast messages. In an example discovery phase, bus devices 106 in the same subnetwork as bus coupler 104(*i*) respond to a broadcast discovery request with their identifier. As non-limiting examples, FDR control module 258 could perform a Devices Profile for Web Services (DPWS) discovery process or a Link Layer Discover Protocol (LLDP) discovery process to discover and identify the bus devices 106 of the subnetwork of bus coupler 104(*i*). More generally, any suitable discovery operation can be utilized, consistent with the functionality described herein.

FDR control module 258 can combine the identifiers of the discovered bus devices 106 into a combined identifier and apply a hash algorithm to the combined identifier to generate a topology hash. If only one bus device 106 was discovered in the corresponding subnetwork, the combined identifier will include the identifier of the discovered bus device 106. In one or more embodiments, the combined identifier is a concatenation of the identifiers provided by the discovery process.

The identifiers of the discovered bus devices 106 can be sorted before being concatenated, such that they are concatenated in a repeatable order. For example and without limitation to combining based on a particular technique, the identifiers can be sorted based on an order of each corresponding bus device 106 with respect to a topology of the corresponding subnetwork 102, an order in which the corresponding bus devices 106 were discovered, information included in the respective identifiers, connections between the corresponding bus devices 106, location information about the corresponding bus devices 106, hierarchy of the corresponding bus devices 106, functionality of the corresponding bus devices, priority level or other types of device information about the corresponding bus devices.

The identifiers of the bus devices 106 can be commercial references, such as catalog names, e.g., TPRST009 or TPRST025 or an assigned name, for example. In some instances, there may be more than one subnetwork 102 that each include bus devices 106 having the same commercial references that have the same topology (meaning same types of bus devices 106 connected within their subnetwork 102 in the same fashion), which could result in two or more bus couplers 104 having the same combined identifier and topology hash. This could be problematic. To avoid this problem, the bus devices 106 in the industrial network system 100 can be assigned unique identifiers, such as by appending a suffix to a common commercial reference (e.g., catalog name). The suffix can be, for example, a serial number of the corresponding bus device 106 or number that is incremented for each different bus device 106.

In an example, a bus coupler 104 can be connected to four bus devices 106 having respective catalog names TPRST009, TPRST009, TPRST025, TPRST025. The bus devices 106 have respective serial numbers 00012, 00013, 00014, and 00015. The FDR control module 258 of the bus coupler 104 concatenates the catalog name and serial number of each bus device 106 to form its identifier. The combined identifier is formed by combining all of the bus device identifiers based on an order related to their topology as: TPRST00900012TPRST00900013TPRST02500014-TPRST02500015h, creating a unique string for the topology of that particular subnetwork 102. The FDR control module 258 of the bus coupler 104 then creates a hash topology of the combined identifier, for instance a 16 character MD5 hash (which would be F4DBD1028ECC7079), and uses it as a device name for the bus coupler 104.

The FDR control module 258 of bus coupler 104(*i*) can then initiate the IP address assignment phase of the replacement process. The IP address assignment phase includes the FDR control module 258 submitting an IP address request to IP address assignment server 116 for an IP address assignment for bus coupler 104(*i*). IP address assignment server 116 can be a DHCP server. The address request can be a broadcast request (referred to for DHCP as a discover). IP address assignment server 116 responds to the address request by assigning an available IP address to bus coupler 104(*i*), which can be a different IP address than the previous bus coupler 104 that was replaced by bus coupler 104(*i*). The ability to dynamically assign IP address avoids the need for static IP addresses or a static topology of the overall network. In addition, IP address assignment server 116 can provide a path (e.g., IP address and/or route) for communicating with FDR server 118 if needed, such as when IP address assignment server 116 and FDR server 118 have different IP addresses.

Using the path and/or IP address of FDR server 118 (whether already known by FDR control module 258 or received from IP address assignment server 116), FDR control module 258 can transmit a configuration request to FDR server 118. The configuration request includes the topology hash and either requests initial installation of an original bus coupler 104 or requests configuration information for a replacement bus coupler, such as bus coupler 104(*i*) shown in FIG. 2.

When FDR server 118 receives a configuration request, FDR server 118 can determine whether the configuration request is for an initial installation of an original bus coupler 104 in industrial network system 100 or for a configuration or reconfiguration, e.g., due to a replacement process. This determination can be made by an indication in the configuration request and/or by FDR server determining whether the hash topology is already mapped to configuration information, which would not be the case during a first installation.

A determination that the configuration request is associated with an initial installation could prompt the FDR server 118 to obtain an identifier of the bus coupler 104(*i*) that sent the configuration request and to automatically request from a preconfigured mapping of identifiers to configuration information stored in data store 220 configuration information (and optionally a network name) for the identifier obtained. The identifier could be sent automatically with the first configuration or can be requested by FDR server 118. This identifier can be any unique identifier with which the original bus coupler 104(*i*) is configured, which can be a descriptive network name or other identifier. The preconfigured mapping of identifiers to configuration mapping can be preconfigured, for example, at a manufacture or system design phase. Communication between FDR server and bus coupler 104(*i*) can be performed using DHCP transactions.

The FDR server 118 can further obtain the topology hash from the original bus coupler 104(*i*) and store the topology hash in data store 220 mapped to the configuration information for bus coupler 104(*i*). This mapping can be used by future replacement devices that will have the same topology hash. The replacement device's topology hash can be used as a key to access the configuration information and (optionally) network name to be used for the replacement device.

Optionally a specified network name (previously stored in or newly entered) can be included with the configuration information and/or mapped to the topology hash. A bus coupler 104's network name is a name that can be used for identification or discovery of the bus coupler 104 to other devices coupled to network 120, such as other bus couplers 104, or to a user. The network name can be a descriptive name that is meaningful to the user.

The mapping of the topology hash to the configuration information and identifier and/or network name of the bus coupler can be performed within firmware of PLC 110, such as firmware of FDR server 118. For example, the firmware can be configured to request the identifier and/or network name and topology hash from bus coupler 114(i), and then map the information together in data store 220, which can then be referenced later.

When it is determined that the configuration request is for a configuration or reconfiguration, such as when bus coupler 104(i) is a replacement device, bus coupler 104(i) is installed in a particular subnetwork 102 and replaces the previous bus coupler 104 that was installed in that subnetwork 102, wherein the previous bus coupler 104 could be the original bus coupler 104 or a different replacement bus coupler. Upon receiving the configuration request, the FDR server 118 can perform a lookup in the device name mapping 222 using the topology hash specified within the configuration request to determine configuration information from the configuration profiles collection 224 that corresponds to the topology hash. FDR server 118 could then return the corresponding configuration information to FDR control module 258 (e.g., using network 140).

Upon receiving the configuration information, FDR control module 258 can configure, for example and without limitation, the application-specific configuration information 260 and the network configuration information 262 on the bus coupler 104 using the configuration information. In one embodiment, the FDR control module 258 is configured to perform a validation operation on the received configuration information, prior to configuring the bus coupler 104 using the configuration information. For example, the bus coupler 104 can store (e.g., in memory 254) data specifying a device type of the bus coupler 104, and the FDR control module 258 can verify that device type information specified in the received configuration information matches a device type stored on the bus coupler 104. As another example, the configuration information could specify a number and type information of connected bus devices, and the FDR control module 258 can verify that device types of the bus devices 106 in bus coupler's subnetwork 102 match the corresponding device types specified within the configuration information. More generally, however, any suitable form of validation operation could be performed, consistent with the functionality described herein.

Possible advantages include an improved fast device replacement process that provides faster device replacement relative to conventional solutions and reduces or eliminates the need for manual user intervention in the replacement process. Moreover, IP addresses used by the overall network can be dynamic, and bus devices 106 do not need to store information about the bus coupler 104 in their subnetwork and do not need to have capabilities of bidirectional communication with the bus coupler. Rather, bus devices 106 merely need to be capable of participating in the discovery phase of the replacement process for being discovered and identified.

Of note, while the depicted embodiment illustrates PLC device 110 connected with a bus coupler, which in turn manages multiple bus couplers 104 that each can manage one or more bus devices 106, such an architecture is provided for illustrative purposes only and without limitation. More generally, however, it is contemplated that embodiments described herein can be practiced in any similar environments with any computing devices replacing PLC device 110, bus couplers 104, and the bus devices 106.

Figure 3:
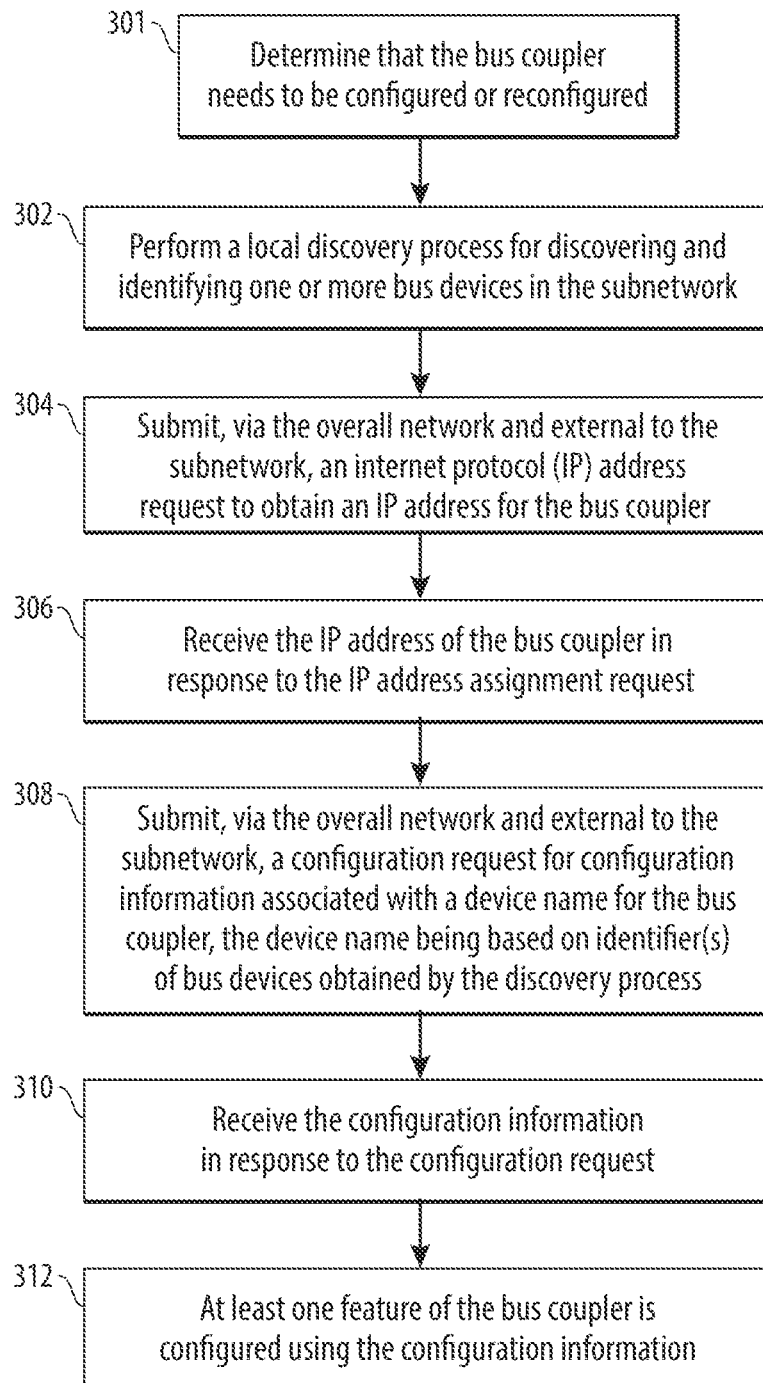
FIG. 3 is a flowchart illustrating an example method performed by a bus coupler of the industrial network system, in accordance with one or more embodiments of the disclosure.
Figure 4:
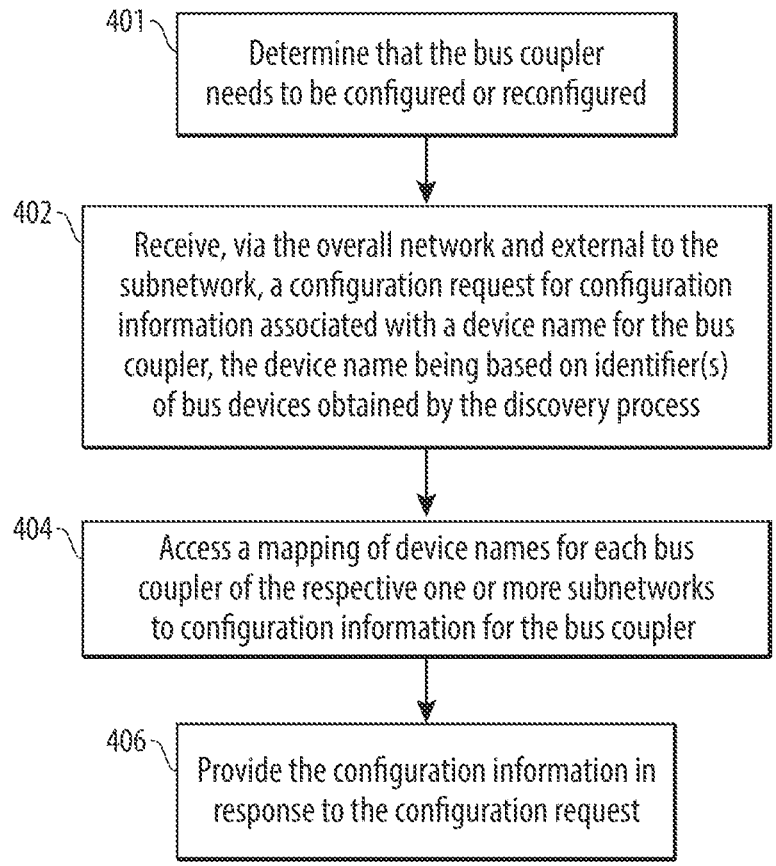
FIG. 4 is a flowchart illustrating an example method performed by a fast device replacement server of the industrial network system, in accordance with one or more embodiments of the disclosure.
Figure 5:
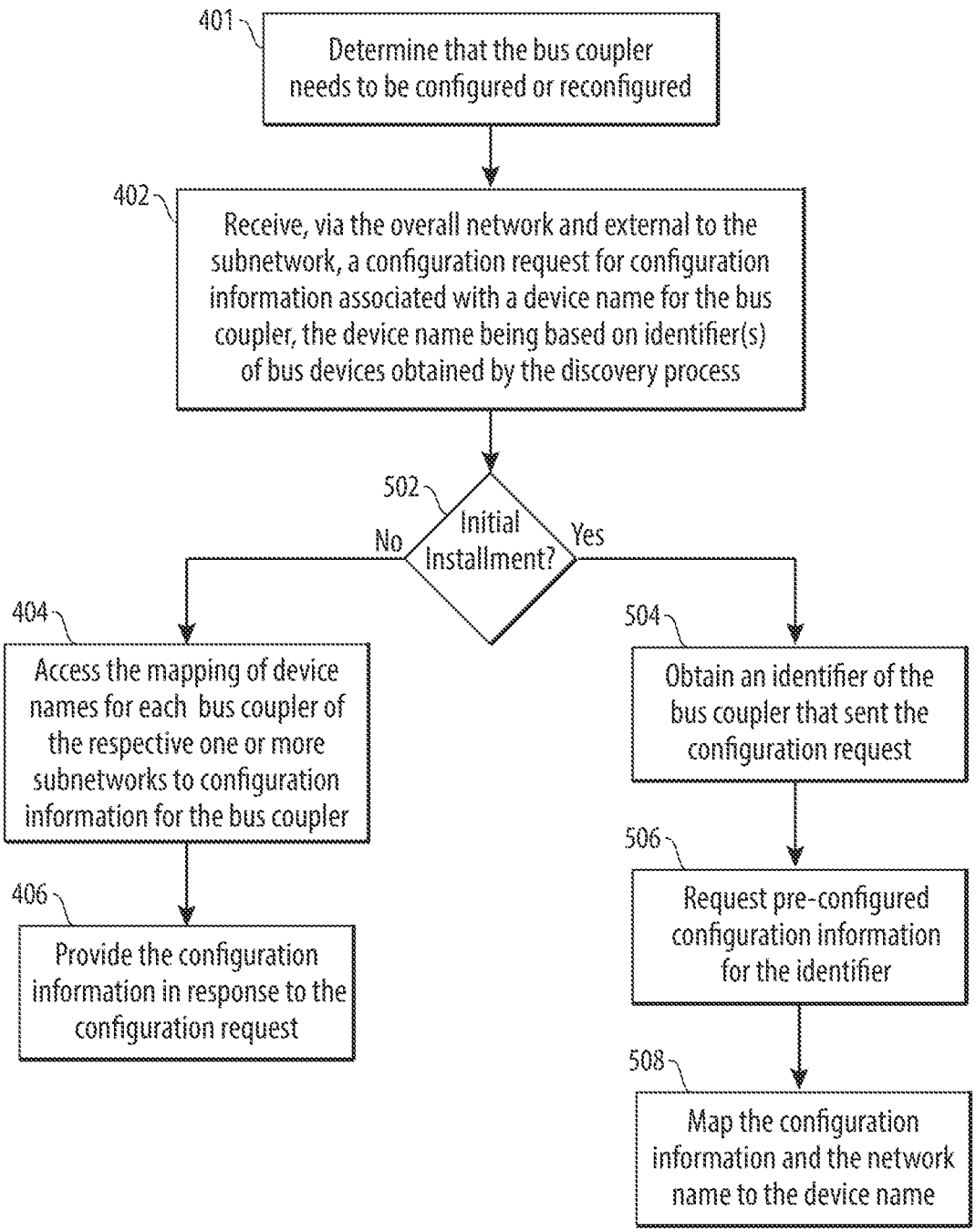
FIG. 5 is a flowchart illustrating a further example method performed by the fast device replacement server, in accordance with one or more embodiments of the disclosure.

With reference now to FIGS. 3-5, shown are flowcharts demonstrating example implementation of the various exemplary embodiments. It is noted that the order of blocks shown in FIGS. 3-5 is not required, so in principle, the various blocks may be performed out of the illustrated order or in parallel. Also certain blocks may be skipped, different blocks may be added or substituted, or selected blocks or groups of blocks may be performed in a separate application following the embodiments described herein.

FIG. 3 illustrates a flowchart that shows an example method performed by a bus coupler of a subnetwork of one or more subnetworks coupled to an overall network 102 of an industrial network system, such as bus coupler 104 of subnetwork 102 coupled network 120 that is provided as an overall network for industrial network system 100 shown in FIG. 1. At block 301, in accordance with one or more embodiments, it is determined that the bus coupler needs to be configured.

At block 302, a local discovery process is performed for discovering and identifying bus devices included in the subnetwork. The local discovery process can be limited to the subnetwork and allow the bus coupler to discover and identify only bus devices in the subnetwork.

At block 304, an IP address request is submitted via an overall network and external to the subnetwork. The IP address requests assignment of an IP address to the bus coupler. At block 306, the IP address of the bus coupler is received in response to the IP address assignment request.

At block 308, a configuration request for configuration information associated with a device name for the bus coupler is submitted via the overall network and external to the subnetwork. The device name is based on identifier(s) of the respective one or more bus devices obtained by the discovery process.

At block 310, the configuration information is received in response to the configuration request. At block 312, configuring at least one feature of the bus coupler using the configuration information.

FIG. 4 illustrates a flowchart that shows an example method performed by an FDR server of an industrial network system, such as FDR server 218 of industrial network system 100 shown in FIG. 1. At block 401, in accordance with one or more embodiments, it is determined that a bus coupler needs to be configured or reconfigured.

At block 402, a configuration request is received from a bus coupler of a subnetwork. The bus coupler can be equivalent in structure and function to bus coupler 104 of subnetwork 102 of industrial network system 100 shown in FIG. 1. The configuration request is received external to the subnetwork via an overall network coupled to one or more subnetworks. The overall network can be equivalent to network 120 shown in FIG. 1. The configuration request requests configuration information associated with a device name for the bus coupler, wherein the device name is based on identifier(s) of respective one or more bus devices obtained by a discovery process performed locally within the subnetwork for discovering and identifying the respective one or more bus devices included in the subnetwork.

At block 404, a mapping is accessed, wherein the mapping maps device names for each bus coupler of the respective one or more subnetworks to configuration information for the bus coupler. The device name for each of the bus couplers is based on identifier(s) of respective one or more bus devices obtained by a previously performed discovery process that was performed locally within the bus coupler's subnetwork for discovering and identifying respective the one or more bus devices included in the subnetwork. At block 406, the configuration information is provided in response to the configuration request.

With reference to FIG. 5, blocks 401, 402, 404, and 406 are described with reference to FIG. 4. After performance of blocks 401 and 502, a determination is made at block 502 whether the bus coupler is being initially installed. If the determination is that the bus coupler has been previously installed, operations 404 and 406 are performed. If it is determined at block 502 that this is an initial installation, the method continues at block 504. At block 504, an identifier is obtained for the bus coupler that sent the configuration request. At block 506, pre-configured configuration information (and optionally a network name) is requested for the identifier. At block 508, the configuration information is mapped (and optionally the network name) to the device name.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method performed by a bus coupler of a subnetwork of one or more subnetworks coupled to an overall network, the method comprising:
 performing a local discovery process for discovering and identifying one or more bus devices included in the subnetwork;
 submitting, by the bus coupler via the overall network and external to the subnetwork, an internet protocol (IP) address request to obtain an IP address for the bus coupler;
 receiving, by the bus coupler, the IP address of the bus coupler in response to the IP address assignment request;

submitting, by the bus coupler via the overall network and external to the subnetwork, a configuration request for configuration information associated with a device name for the bus coupler, wherein the device name is based on identifier(s) of the respective one or more bus devices obtained by the discovery process, and the device name is provided for identifying the configuration information for the bus coupler via a mapping of the device name to the configuration information;

receiving the configuration information in response to the configuration request; and configuring at least one feature of the bus coupler by applying the configuration information to at least one configurable component of the bus coupler.

2. The method of claim 1, further comprising computing at the bus coupler a topology hash by applying a hash function to the identifier(s) of the respective one or more bus devices, wherein the device name is based on the topology hash.

3. The method of claim 2, wherein the one or more bus devices include a plurality of bus devices, the method further comprising combining the identifiers of the respective plurality of bus devices, wherein the hash function is applied to the combination.

4. The method of claim 3, wherein combining the identifiers of the plurality of bus devices includes concatenating the identifiers of the respective plurality of bus devices in a predefined order.

5. The method of claim 4, wherein the identifiers of the respective plurality of bus devices are concatenated based on an order in which the bus devices corresponding to the respective identifications are discovered, based on a topology of the subnetwork, based on information included in the respective identifiers, and/or based on the connections between the bus devices that were discovered.

6. The method of claim 1, wherein the identifier(s) of the one or more bus devices includes one or more commercial references.

7. The method of claim 1, wherein a path to a server to service the configuration request is provided in response to the address request, and the configuration request is submitted using the path.

8. The method of claim 1, wherein the configuration information is further correlated with a network name of the bus coupler, wherein the network name is a name to identify the bus coupler and is used for network discovery requests and identification of the bus coupler by network devices coupled to the overall network that are external to the subnetwork.

9. The method of claim 1, further comprising validating the configuration information, wherein the at least one feature of the bus coupler is configured once the configuration information is validated.

10. The method of claim 1, wherein the at least one configurable component of the bus coupler comprises:
network connectivity information and/or application-specific configuration information.

11. The method of claim 1, further comprising determining, by the bus coupler, that the bus coupler needs to be configured or reconfigured, wherein in response to determining that the bus coupler needs to be configured or reconfigured, the bus coupler initiates performing the discovery process, submitting the address request, and/or submitting the configuration request.

12. A method comprising:
receiving, by a fast device replacement (FDR) server via an overall network coupled to one or more subnetworks, a configuration request from a bus coupler of a subnetwork of the one or more subnetworks, wherein the configuration request was provided external to the subnetwork and requests configuration information associated with a device name for the bus coupler, wherein the device name is based on identifier(s) of respective one or more bus devices obtained by a local discovery process for discovering and identifying the respective one or more bus devices included in the subnetwork;

accessing, by the FDR server, a mapping of device names for each bus coupler of the respective one or more subnetworks to configuration information for the bus coupler, the configuration information established to be applied to at least one configurable component of the bus coupler, wherein the device name for each of the bus couplers is based on identifier(s) of respective one or more bus devices obtained by a previously performed discovery process that was performed locally within the bus coupler's subnetwork for discovering and identifying respective the one or more bus devices included in the subnetwork; and providing, by the FDR server, the configuration information that is mapped to the device name in the configuration request in response to the configuration request.

13. The method of claim 12, wherein the device name is based on a topology hash computed at the bus coupler by applying a hash function to the identifier(s) of the respective one or more bus devices.

14. The method of claim 13, wherein the one or more bus devices include a plurality of bus devices, wherein the hash function is applied to a combination of the identifiers of the respective plurality of bus devices.

15. The method of claim 14, wherein the combination of the identifiers is a concatenation of the identifiers in a predefined order, wherein the concatenation of the identifiers is based on an order in which the bus devices corresponding to the respective identifications are discovered, based on a topology of the subnetwork, based on information included in the respective identifiers, and/or based on connections between the bus devices that were discovered.

16. The method of claim 12, wherein the mapping further maps the device name to a network name of the bus coupler, wherein the network name is a name to identify the bus coupler and is used for network discovery requests and identification of the bus coupler by network devices coupled to the overall network that are external to the subnetwork.

17. The method of claim 12, wherein the at least one configurable component of the bus coupler includes network connectivity information and/or application-specific configuration information.

18. The method of claim 12, further comprising determining that the bus coupler needs configuration or reconfiguration, wherein in response to determining that the bus coupler needs to be configured or reconfigured, the FDR server accesses the mapping and provides the configuration response.

19. A bus coupler of a subnetwork of one or more subnetworks coupled to an overall network, the bus coupler comprising:
a memory configured to store instructions; and
one or more processing devices disposed in communication with the memory, wherein the one or more processing devices upon execution of the instructions are configured to:

perform a local discovery process for discovering and identifying one or more bus devices included in the subnetwork;

submit, via the overall network and external to the subnetwork, an internet protocol (IP) address request to obtain an IP address for the bus coupler;

receive the IP address of the bus coupler in response to the IP address assignment request;

submit, via the overall network and external to the subnetwork, a configuration request for configuration information associated with a device name for the bus coupler, wherein the device name is based on identifier(s) of the respective one or more bus devices obtained by the discovery process and the device name is provided for identifying the configuration information for the bus coupler via a mapping of the device name to the configuration information;

receive the configuration information in response to the configuration request; and configure at least one feature of the bus coupler by applying the configuration information to at least one configurable component of the bus coupler.

20. The bus coupler of claim 19, wherein the one or more bus devices include a plurality of bus devices and the one or more processing devices upon execution of the instructions are further configured to:

combine the identifiers of the respective plurality of bus devices; and apply a hash function to the combined identifier(s), wherein the device name is based on the topology hash.

21. A fast device replacement (FDR) server, comprising:
a memory configured to store instructions; and
one or more processing devices disposed in communication with the memory, wherein the one or more processing devices upon execution of the instructions are configured to:

receive, via an overall network coupled to one or more subnetworks, a configuration request from a bus coupler of a subnetwork of the one or more subnetworks, wherein the configuration request was provided external to the subnetwork and requests configuration information associated with a device name for the bus coupler, wherein the device name is based on identifier(s) of respective one or more bus devices obtained by a local discovery process for discovering and identifying the respective one or more bus devices included in the subnetwork;

access a mapping of device names for each bus coupler of the respective one or more subnetworks to configuration information for the bus coupler, the configuration information established to be applied to at least one configurable component of the bus coupler, wherein the device name for each of the bus couplers is based on identifier(s) of respective one or more bus devices obtained by a previously performed discovery process that was performed locally within the bus coupler's subnetwork for discovering and identifying respective the one or more bus devices included in the subnetwork; and provide the configuration information in response to the configuration request.

22. The FDR server of claim 21, wherein the one or more bus devices include a plurality of bus devices, and the device name is based on a topology hash computed at the bus coupler by applying a hash function to a combination of the identifiers of the respective plurality of bus devices.

23. An industrial network system, comprising:
a bus coupler of a subnetwork of one or more subnetworks coupled to an overall network, the bus coupler, comprising:
a memory configured to store instructions; and
one or more processing devices disposed in communication with the memory, wherein the one or more processing devices upon execution of the instructions are configured to:

perform a local discovery process for discovering and identifying one or more bus devices included in the subnetwork;

submit, via the overall network and external to the subnetwork, an internet protocol (IP) address request to obtain an IP address for the bus coupler;

receive the IP address of the bus coupler in response to the IP address assignment request;

submit, via the overall network and external to the subnetwork, a configuration request for configuration information associated with a device name for the bus coupler, wherein the device name is based on identifier(s) of the respective one or more bus devices obtained by the discovery process, and the device name is provided for identifying the configuration information for the bus coupler via a mapping of the device name to the configuration information;

receive the configuration information in response to the configuration request; and configure at least one feature of the bus coupler by applying the configuration information to at least one configurable component of the bus coupler; and a fast device replacement (FDR) server, comprising:
a second memory configured to store second instructions; and
one or more second processing devices disposed in communication with the second memory, wherein the one or more second processing devices upon execution of the second instructions are configured to:

receive, via the overall network, the configuration request from the bus coupler;

access a mapping of device names for each bus coupler of the respective one or more subnetworks to configuration information for the bus coupler, the configuration information established to be applied to at least one configurable component of the bus coupler, wherein the device name for each of the bus couplers is based on identifier(s) of respective one or more bus devices obtained by a previously performed discovery process that was performed locally within the bus coupler's subnetwork for discovering and identifying respective the one or more bus devices included in the subnetwork; and provide the configuration information that is mapped to the device name in the configuration request in response to the configuration request.

* * * * *